Figure 1:
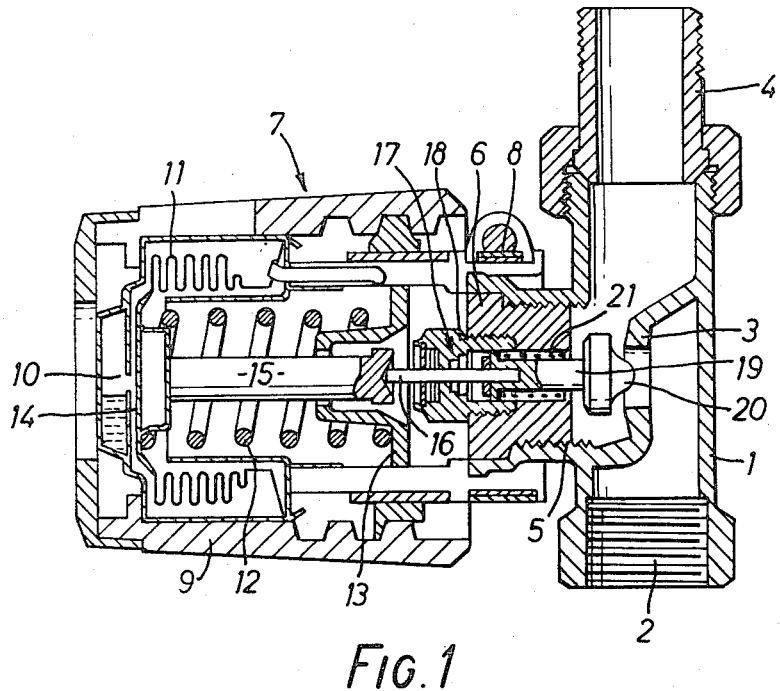

United States Patent [19]

Nielsen

[11] 3,797,805

[45] Mar. 19, 1974

[54] SEALING MEANS FOR A VALVE STEM

[75] Inventor: Helmer Trost Nielsen, Nordborg, Denmark

[73] Assignee: Danfoss A/S, Nordborg, Denmark

[22] Filed: Sept. 25, 1972

[21] Appl. No.: 291,764

[30] Foreign Application Priority Data

Oct. 12, 1971   Germany............................ 2150788

[52] U.S. Cl.................. 251/214, 137/67, 251/297, 285/DIG. 26, 277/DIG. 11
[51] Int. Cl............................................. F16k 41/04
[58] Field of Search ........... 251/214, 213, 291, 297; 277/DIG. 11; 285/DIG. 26, 351; 137/67

[56] References Cited
UNITED STATES PATENTS

| | | |
|---|---|---|
| 3,490,735 | 1/1970 | Nielsen et al....................... 251/214 |
| 672,255 | 4/1901 | Boberg........................... 285/DIG. 26 |
| 2,277,286 | 3/1942 | Bechtner....................... 285/DIG. 26 |
| 2,810,592 | 10/1957 | Williams........................... 285/351 X |
| 2,945,541 | 7/1960 | Maly et al..................... 277/DIG. 11 |
| 2,849,070 | 8/1958 | Maly............................ 277/DIG. 11 |

Primary Examiner—Alan Cohan
Assistant Examiner—David R. Matthews

[57] ABSTRACT

The invention relates to a thermostatic valve assembly for controlling the flow of a liquid therethrough. The assembly has a secondary seal for its valve stem which is made of a material which expands when contacted by a leaking quantity of the liquid being controlled. The expansion of the seal inhibits the leakage and the movement of the valve closure member. This manifestation of malfunctioning is a signal that the primary seal has become defective.

7 Claims, 3 Drawing Figures

SEALING MEANS FOR A VALVE STEM

The invention relates to a sealing means for a valve stem and comprising a primary seal and a secondary seal fitted downstream thereof.

When the seal of the valve is damaged, the medium to be sealed off escapes therefrom. As a rule, only small quantities of the medium initially escape; later the quantities that are leaked increase. It is desirable to repair or replace the sealing means before any considerable damage occurs. The leak is recognized from the escaping medium. For example, a damp area forms on the floor or carpet beneath a valve in a hot water heating system.

It is known to increase the service life of a sealing means by fitting a secondary seal downstream of a primary seal, this secondary seal taking over the function of the primary seal when the latter becomes unsound. However, the same things happen at the end of the extended life of such a seal as do in the case of a single seal.

The object of the invention is to indicate that a leak has developed without allowing the medium that is to be sealed off to escape, or, under otherwise similar circumstances, to permit only a quite small amount of the medium to escape before the leak is known to have developed.

According to the invention, this object is achieved by making the sealing element of the secondary seal of a material that increases in volume upon contact with the medium to be sealed off and is so fitted that when it increases in volume it applies to the valve stem clamping forces which inhibit displacement of the valve.

In this construction, the secondary seal not only serves to extend the period during which the sealing means remains sound, but it also prevents the valve functioning in the event of a leak developing. This malfunctioning provides a signal for indicating that the primary seal has become defective. In the case of manually operated valves, such malfunctioning can be detected directly when displacement by hand is carried out, and in the case of automatically actuated valves it is detected indirectly as a result of defective operation of the system downstream of the valve. Since, when it increases in volume, the material of the sealing element generally also absorbs the medium, this ensures that no medium escapes over a fairly lengthy period of time.

Particular advantages are obtained if the valve stem is axially displaceable and its inward movement is achieved by means of a control element, in particular a thermostat attachment, which engages it in a mechanically positive manner, and its outward movement is achieved by a return spring, and if the force of the return spring is less than that force that overcomes the clamping forces. In a valve of this kind, the stem remains in it inner end position when a leak develops. It is urged into this position by the forces from the control element, which forces increase if the control action is not produced. The weak return spring however can no longer urge the spindle outwards. If an automatically controlled valve occupies this inner end position for any length of time, trouble occurs in the system located downstream of the valve and this enables the malfunctioning of the valve and therefore the development of a leak to be recognised.

Particular advantage accrues when the valve is one used in a central-heating system and if it closes when executing its inward movement. The appearance of a damp path below the valve is particularly troublesome in the case of valves used specifically in central-heating systems. When such a valve develops a leak, this is indicated by the fact that the downstream radiator becomes cold although the temperature at which the system has been set should provide warmth.

In a preferred embodiment, the sealing element, when not increased in volume, loosely surrounds the stem. This means that the sealing element applies no force at all to the valve stem during the normal functioning of the valve. This offers special advantages in the case of valves that are actuated automatically and in particular thermostatically, since even small control forces suffice for displacing the valve, and the differential of the valve can therefore be kept small.

The best effects are achieved when the medium to be sealed off is water and when the material of the sealing element swells under the action of the water. Relatively large changes in volume are achieved in this way, and correspondingly high clamping forces are generated. Examples of suitable materials are leather or hydrate cellulose such as vulcanized fibre material.

The sealing element expediently consists of a plurality of discs extending transversely of the axis of the valve stem. With such an arrangement, each disc can apply a radial clamping force to the stem independently of the other discs. Furthermore, preferred materials such as hydrate cellulose fibres expand to a greater degree in the plane of the disc than transversely thereof, so that increased clamping forces are achieved.

In another advantageous form, the sealing element consists of a coil of material wound round the stem. A coil of this kind is not only able to generate clamping forces in the radial direction as a result of increase in volume, but can also become inwardly curved when the coil becomes compressed as a result of increase in volume in the axial direction.

Figure 2:
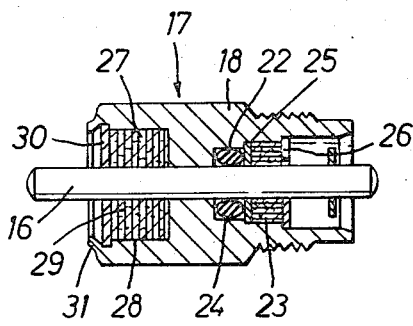
Figure 3:
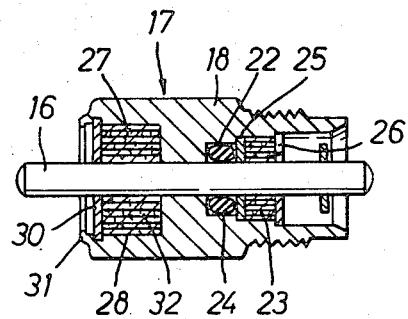

The invention will now be described in greater detail by reference to the preferred embodiment illustrated in the drawing, in which:

FIG. 1 is a longitudinal section through a valve incorporating the sealing means of the invention, FIG. 2 is a section through one form of the sealing means of the invention, and FIG. 3 shows a modified form of the sealing means of the invention.

The valve illustrated in FIG. 1 has a casing 1 incorporating an inlet port 2, a valve seat 3 and an outlet port 4. The casing is provided with a neck 5 into which is screwed a cover 6 and on which a thermostat attachment 7 is secured by means of a clamping device 8. The thermostat attachment comprises a hollow rotatable grip 9 whidh surrounds a temperature sensor 10 and a thermostatic operating element 11. A calibrated spring 12 counteracts the vapour pressure obtaining in the operating elemnt, and the backing element 13 for the spring can be axially displaced with the aid of the rotatable grip 9 for the purpose of setting to the required value.

A plate 14 forming part of the operating element 11 carries a plunger 15 which acts in a mechanically positive manner on the valve stem 16. The valve stem 16 extends through a sealing means 17 which is accommodated in a bush 18 screwed into the cover 6. The valve stem 16 acts upon the extension 19 of a closing member 20. The return spring 21 bears against a flange on the extension 19, so that the valve stem 16 engages the plunger 15.

FIG. 2 illustrates the construction of the sealing means. The primary seal is constituted by an O-ring 22, upstream of which is fitted a felt ring 23 which serves as a filter. These parts are accommodated in a bore 24 in the bush 18 and are held in position by metal rings 25 and 26. A secondary sealing element 27 is accommodated in a recess 28. It consists of a plurality of discs 29 made of vulcanized fibre. The discs 29 extend transversely of the axis of the valve stem. The pack of discs is secured by a plate 30 which is retained by a flanged edge 31. The discs 29 loosely surround the stem 16, so that they do not interfere with its movement.

During normal operation of the valve, parts of the liquid contained in the sensor 11 vaporizes in dependence upon the ambient temperature. The vapour pressure in the operating element 11 associated with this temperature urges the plunger 15 into a position corresponding to the vapour pressure, the force of the spring 12 being thereby overcome. If the room temperature rises, the valve is closed, and if the room temperature drops the valve is opened. The full stroke of the closing member 20 corresponds to a temperature differential of, for example, 2° C, as the closing member is able to respond to the vapour pressure in a virtually unrestricted manner, since axial movement is opposed only by the frictional forces applied by the O-ring 22 to the valve stem 16. The frictional forces applied by the felt ring 23 are so small as to be negligible. The discs 29 cause no friction at all.

If the primary seal now becomes unsound and water seeps between the O-ring 22 and the valve stem 16, there is no danger that the water will drip out of the valve at the outer end of the valve stem 16 after having built up to some extent in the interior of the rotatable grip 9. Instead, the drops of water are absorbed by the sealing element 27 of the secondary seal. The material of this element swells, and moves into contact with and grips the stem 16. This clamping force gradually increases in the course of time. At a particular point in time, the clamping forces become so great that the force of the return spring 21 no longer suffices for pushing the stem 16 outwards. This means that after a last control cycle in which excessively high temperature in the room will have caused the operating element 11 to push the closing member on to the seat 3, resultant cooling of the room, while leading to a return movement of the plunger 15, does not however result in opening of the valve. The radiator fitted downstream of the valve remains cold. If the system has been set to provide a required temperature of, for example, 20° C, the cold radiator is a sign of malfunctioning which indicates that the valve is leaking. Similar malfunctioning would also occur if the clamping force increased so rapidly that the forces applied by the thermostat attachment no longer sufficed to move the valve into the closed position. The radiator located downstream of the valve would then become excessively hot.

FIG. 3 shows a modified form of construction in which the sealing element 27' is simply formed by a coil 32 of vulcanized fibre material. Even if the material of this coil does not undergo a particularly great increase in volume in the radial direction upon contact with water, but expands only in the axial direction, sufficient clamping force would develop in a short time, since the individual turns of the coil would curve in the radial direction under the effect of this expansion.

The material of the sealing element of the secondary seal should be so suited to the medium to be sealed off that sufficient increase in volume occurs within an adequate period after a leak has begun to develop.

I claim:

1. A valve assembly comprising a casing, a first bushing attached to said casing and having a bore, a closure member having a shaft portion disposed in said bore, a second bushing attached to said first bushing and having a bore, a rod slidably disposed in said second bushing bore and having contact with said shaft, a primary and secondary seals between said rod and said second bushing, said secondary seal being of a material which increases in volume upon contact with the medium to be sealed, said secondary seal being fitted that upon its volume being increased exerts forces which inhibit the displacement of said rod.

2. A valve assembly according to claim 1 including a return spring for moving said rod in an opening direction.

3. A valve assembly according to claim 1 wherein said secondary seal loosely surrounds said rod when in a dry condition.

4. A valve assembly according to claim 1 wherein said secondary seal is made of leather.

5. A valve assembly according to claim 1 wherein said secondary seal is made of hydrate cellulose.

6. A valve assembly according to claim 1 wherein said secondary seal comprises a plurality of disks.

7. A valve assembly according to claim 1 wherein said secondary seal comprises a coil of material wound around said rod.

* * * * *